United States Patent [19]

Endicott et al.

[11] Patent Number: 6,029,206
[45] Date of Patent: *Feb. 22, 2000

[54] OBJECT-ORIENTED METHOD ROUTING MECHANISM FOR AUTOMATICALLY PERFORMING SUPERVISORY FUNCTIONS DURING METHOD CALLS

[75] Inventors: John C. Endicott; Steven L. Halter; Steven J. Munroe; Erik Edward Voldal, all of Rochester, Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/594,204

[22] Filed: Jan. 31, 1996

Related U.S. Application Data

[63] Continuation-in-part of application No. 08/542,147, Oct. 12, 1995.

[51] Int. Cl.[7] ............................................. G06F 9/40
[52] U.S. Cl. .................................. 709/303; 710/200
[58] Field of Search ................................ 395/670, 726, 395/680; 709/303; 710/200

[56] References Cited

U.S. PATENT DOCUMENTS

| | | | |
|---|---|---|---|
| 4,498,132 | 2/1985 | Ahlstrom et al. | 364/200 |
| 4,500,952 | 2/1985 | Heller et al. | 364/200 |
| 4,731,734 | 3/1988 | Gruner et al. | 364/200 |
| 5,075,848 | 12/1991 | Lai et al. | 395/425 |
| 5,181,162 | 1/1993 | Smith et al. | 364/419 |
| 5,257,371 | 10/1993 | Anezaki | 395/650 |
| 5,263,155 | 11/1993 | Wang | 395/600 |
| 5,265,206 | 11/1993 | Shackelford et al. | 395/200 |
| 5,274,823 | 12/1993 | Brenner et al. | 395/725 |
| 5,276,901 | 1/1994 | Howell et al. | 395/800 |
| 5,283,830 | 2/1994 | Hinsley et al. | 380/25 |
| 5,297,283 | 3/1994 | Kelly, Jr. et al. | 395/650 |
| 5,321,841 | 6/1994 | East et al. | 395/725 |
| 5,392,433 | 2/1995 | Hammersley et al. | 395/725 |
| 5,414,812 | 5/1995 | Filip et al. | 395/200 |
| 5,414,852 | 5/1995 | Kramer et al. | 395/700 |
| 5,493,661 | 2/1996 | Alpert et al. | 395/418 |
| 5,553,287 | 9/1996 | Bailey et al. | 395/650 |
| 5,596,754 | 1/1997 | Lomlet | 395/726 |

OTHER PUBLICATIONS

Matsuoka et al., Highly Efficient and Encapsulated Re-use of Synchronization Code in Concurrent Object-Oriented Languages, ACM, 1993.

Birrell et al., Network objects, SIGOPS, 1993 pp. 217–230.

Kempf et al., Cross-Address Space Dynamic Linking, Sep. 1992.

Proceedings of the 2nd Workshop on Object Orientation in Operating Systems, Sep. 1992.

Kougiouris et al., Support for Space Efficient Object Invocation in Spring, "Spring Collection" Sunsoft, Sep. 1994.

Radia et al., The Spring Names Service, Sun Microsystems Technical Report SMLI-93-16.

(List continued on next page.)

*Primary Examiner*—Lucien U. Toplu
*Attorney, Agent, or Firm*—Martin & Associates, L.L.C.; Derek P. Martin

[57] ABSTRACT

In an object-oriented or object-based computer system, object methods are routed to users (e.g., client programs) after automatically performing supervisory functions. Examples of suitable supervisory functions include authorization checking and locking. One suitable way to automatically perform the supervisory functions is to provide a call method instruction in the operating system that automatically performs these supervisory functions when a user invokes the object method using the instruction. In this manner, the operating system can assure that the user calling the object method has sufficient authority and lock to access the object method. In addition, the method routing mechanism has the ability to forego authorization checking and locking for objects that are unprotected, and may perform abbreviated authorization checking and locking if the operating system determines from local knowledge that a user is currently authorized to and locked on the called object.

9 Claims, 6 Drawing Sheets

OTHER PUBLICATIONS

Cahill et al., Supporting Object–Oriented Languages on the Comandos Platform, Esprit Technical Conf. Brussels, 1991.

Bernabeu et al., The Architecture of Ra: A Kernel for Clouds, Georgia Inst. of Technology, Tech. Report GIT–ICS–88/25, 1989.

Yu, EHE–FN, Security Safeguards for Intelligent Networks, IEEE, Sep. 1989.

Varadharajan et al. A Multilevel Security Model for a Distributed Object–Oriented System, IEEE, 1990.

Mitchell et al., An Overview of the Spring System, IEEE, 1994.

Muth et al., Semantic Concurrency Control in Object Oriented Database Systems, IEEE, 1993.

OBJECT-ORIENTED METHOD ROUTING MECHANISM FOR AUTOMATICALLY PERFORMING SUPERVISORY FUNCTIONS DURING METHOD CALLS

RELATED APPLICATION

This application is a continuation-in-part of patent application Ser. No. 08/542,147 filed on Oct. 12, 1995 pending entitled "Object-Oriented Method Maintenance Mechanism That Does Not Require Cessation of the Computer System or its Programs," which is incorporated herein by reference.

FIELD OF THE INVENTION

This invention generally relates to computer systems. More specifically, this invention relates to an object-oriented mechanism for performing supervisory functions during method routing.

BACKGROUND OF THE INVENTION

The development of the EDVAC computer system of 1948 is often cited as the beginning of the computer era. Since that time, computer systems have found their way into just about every aspect of the American lifestyle. One reason for this proliferation is the ability of computer systems to perform a variety of tasks in an efficient manner. The mechanisms used by computer systems to perform these tasks are called computer programs.

Like computer systems themselves, the development of computer programs has evolved over the years. The EDVAC system used what was called a "one address" computer programming language. This language allowed for only the most rudimentary computer programs. By the 1960s, improvements in computer programming languages led to computer programs that were so large and complex that it was difficult to manage and control their development and maintenance.

Therefore, the focus of the 1970s was on developing programming methodologies and environments that could better accommodate the increasing complexity and cost of large computer programs. One such methodology is called Object Oriented Programming (OOP). Though it has been some time since the fundamental notions of OOP were first developed, OOP systems are becoming more and more prevalent because it is felt that use of OOP can greatly increase the efficiency of computer programmers. Not surprisingly, objects are central to OOP technology. A single object represents an individual operation or a group of operations that are performed by a computer system upon information controlled by the object. Objects can be thought of as autonomous agents that work together to perform certain tasks. Sometimes entire computer programs are made up of groupings of objects and sometimes objects are simply accessed by more traditional computer programs to perform one specific task or subtask. For a general background regarding objects and object-oriented programming, see Grady Booch, *Object Oriented Design with Applications*, (Benjamin/Cummings Publishing Co. 1991), and the Overview section herein.

While the use of OOP has led to greater programmer efficiency, that same use brings with it several challenges that have yet to be overcome by prior art mechanisms. One such challenge is handling objects that are persistent and shareable. An object is persistent if the object has a lifetime independent of its users. An object is shareable if there exists a mechanism for allowing multiple users to access one or more of the object's methods. An object is secure if users are unable to access the object unless they have sufficient authority. When objects are persistent and shareable and secure, access to methods on these objects must be controlled using authorization checks and locking mechanisms. Authorization checking assures that the user calling the method is authorized to access the object, while locking assures that users may not interfere with one another when accessing the same object. For purposes of the discussion herein, a "user" of a method is any client process that accesses (or calls) a method within an object. A client process (or user) that calls a method of a server object may be another object (e.g., in the case of OOP), or may be any other suitable client program that calls the method.

Known solutions to authorization checking and locking are unsatisfactory for a number of reasons. One known solution is to require that the programmer write code to determine/set the authorization of an object and to check its authorization and to obtain a lock of the object. This scheme effectively gives a programmer the power to decide if the client program is authorized to access the method. Putting this power and responsibility in the programmer's hands requires that the programmer follow strict rules in programming, which may be intentionally or inadvertently violated by the programmer. In addition, the extra code required for the authorization checking and locking functions substantially degrades the performance of the computer program, increases its size, and increases the complexity of the program. This user-driven scheme of authorization checking and locking is only as good as the programmer using it, and the ease with which it may be ignored or violated along with the run-time penalty makes it an undesirable solution. Without a mechanism for automatically performing authorization checks and locking functions when a method on a persistent, shareable object is called, the efficiency and security of computer programs will be impaired, resulting in less than optimal performance from computers running these computer programs.

SUMMARY OF THE INVENTION

According to the present invention, a method routing mechanism automatically performs supervisory functions when a method is called by a client program (i.e., user). Common supervisory functions include authorization checking and locking to assure that access is not granted to the user unless the user has the appropriate authority and lock on the called object. By providing automatic supervisory functions when routing method calls, the computer system is more secure and robust, eliminating the possibility of a client program obtaining access to a method in a called object when the client program does not have the requisite authorization and locking levels. In addition, the method routing mechanism has the ability to forego authorization checking and locking for methods that are unprotected (e.g., not persistent or shared), and may perform an abbreviated authorization check and locking cycle if the operating system can determine from local knowledge that a user is currently authorized to access a called object and already has the appropriate level of locking for the called object.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DESCRIPTION OF THE PREFERRED EMBODIMENTS

Overview

Object Oriented Technology

Figure 1:
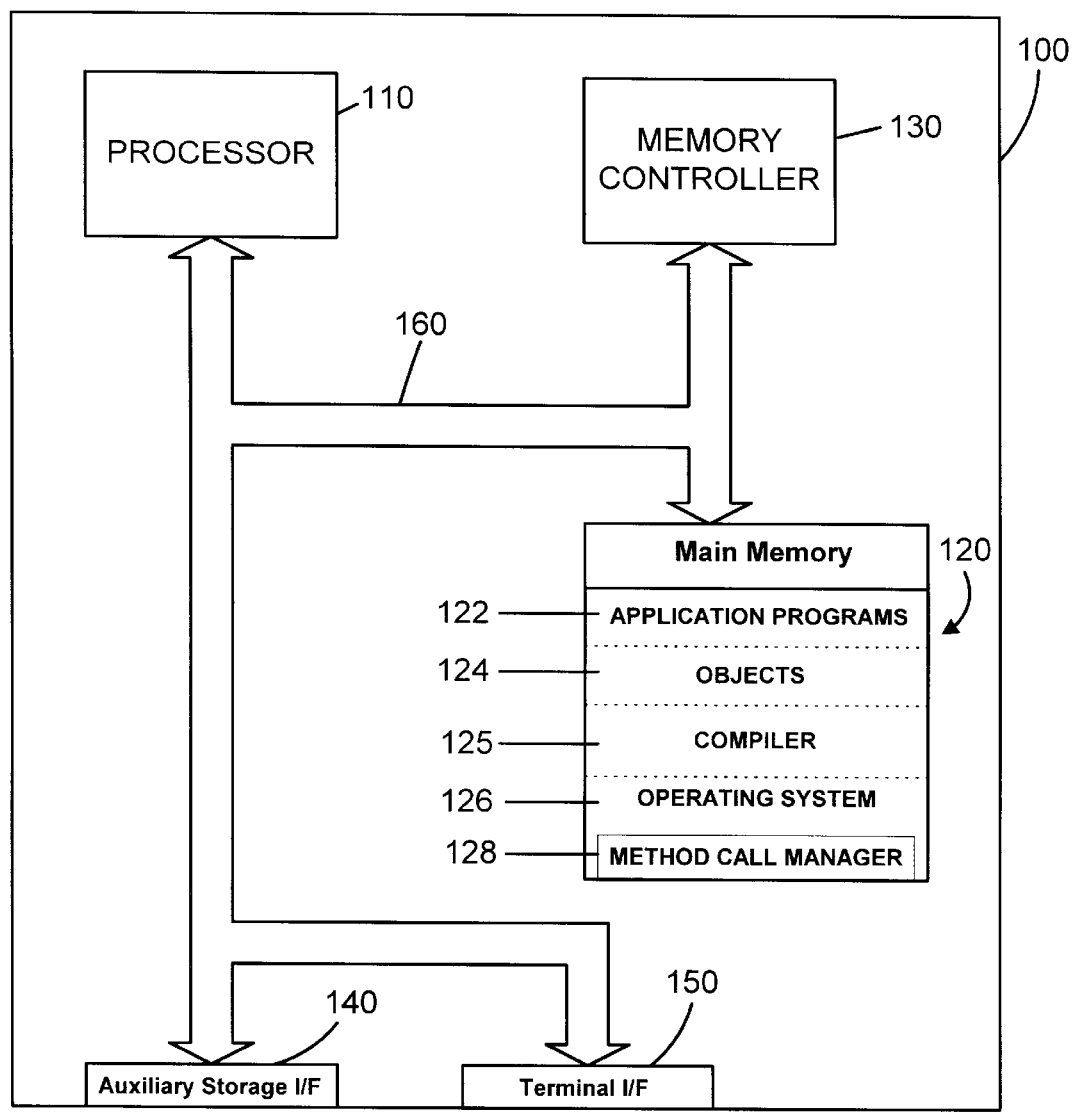
FIG. 1 is a block diagram of a computer system in accordance with the present invention.

As discussed in the Background section, objects can be thought of as autonomous agents that work together to perform the tasks required by a computer system. A single object represents an individual operation or a group of operations that are performed by a computer system upon information controlled by the object. The operations of objects are called "methods" or "functions," and the information controlled by objects is called "object data" or just "data." Objects are created (i.e., "instantiated") as members of something called a "class." A class is used to define its members. Classes define the data that will be controlled by their member objects and the functions or methods that their member objects will have to provide access to that data. For the discussion herein, the functions or methods of an object are generically referred to as "methods." Note, however, that at times (especially in the claims) the term "object method" is used to avoid confusion relating to other "methods" in the word's more generic sense. In addition, while objects have specific definitions with regard to object-oriented programming, the term "object" as used in this specification encompasses not only the common OOP notion of an object, but equally encompasses other "objects" in a computer program that may be object-based rather than object-oriented, or that may be other portions of code in a procedural language, such as procedures or functions. In sum, an "object" as used herein is a generic term for any portion of code that has functions and corresponding data upon which the functions operate.

When an object or program needs access to the data controlled by a second object, it is considered to be a client of the second object. To access the data controlled by the second object, one of the methods of the client object (i.e., a client method) or client program will call or invoke the second object to gain access to the data controlled by that object. One of the methods of the called object (i.e., a server method in this case) is then used to access and/or manipulate the data controlled by the called object (i.e., the server object).

Method Routing and Supervisory Functions

The process of allowing access to a server method by a client is known as method routing. As described above, when objects are persistent, secure and shareable, supervisory functions such as authorization checking and locking for the objects of the invoked methods must be performed. Using one suitable method for checking authorization, an authorization table is created that indicates which users are authorized to access each protected method for that object. Authorization checking is performed by determining if the user is in the list of authorized users for the called method for that object. If the user is on the list in the authorization table, the user is authorized to access the called method. Note that other authorization schemes may be used that have several different levels of authorization, and that require comparing the level required to the level of authorization for the client program.

In similar fashion, using one suitable method for checking and obtaining lock of an object method, several different levels of locking exist, and the current lock level and identifier of the process holding the lock of the object method is stored in the object. Each user must acquire a particular required lock level depending on the method called and the user calling the method. Locking is checked by comparing the required lock level for the user to the current lock level by that user stored in the object. If the current lock level exceeds the required lock level, the user already has the object locked. If the current lock level is less than the required lock level, the system attempts to obtain the required lock level. If successful, the current lock level is increased and the user has sufficient lock on the object method to access the method. If the required lock level cannot be attained, the current lock level is not changed, and the system responds by indicating that lock of the object could not be obtained.

Known methods and procedures for performing these supervisory functions of authorization and checking during method routing require that the programmer that codes the client calling the method add code to monitor and control supervisor functions. This additional code creates inefficiencies, and putting the authorization checking and locking in the programmer's control creates potential security violations in the run-time code. If the authorization checking and locking functions were built into the method routing mechanism, the problems with the known method routing methods and procedures would be solved. However, performing authorization and checking for each method call would add a great deal of overhead to the computer program.

Mechanisms of the Present Invention

The apparatus and method in accordance with the present invention use a system call to the operating system when invoking a method to automatically determine whether authorization checking and locking are required, and to automatically check the authorization and locking of the corresponding object vis-a-vis the client that is invoking the method when required, as described below.

Detailed Description

Referring to FIG. 1, a computer system 100 in accordance with the present invention is an enhanced IBM AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor.

Auxiliary storage interface 140 is used to allow computer system 100 to store and retrieve information from auxiliary storage, such as magnetic disk (e.g., hard disks or floppy diskettes) or optical storage devices (e.g., CD-ROM). Memory controller 130, through use of a processor separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication could be used.

Main memory 120 contains application programs 122, objects 124, a compiler 125, and an operating system 126. While application programs 122, objects 124, and operating system 126 are shown to reside in main memory 120, those skilled in the art will recognize that these entities are shown in this manner to represent the fact that programs are typically loaded from slower mass storage into faster main memory to execute. Depicting these entities in this manner should not be taken to mean that they are necessarily all completely contained in main memory 120 at the same time. It should also be noted that the term main memory includes any computer system memory, and is used herein to generically refer to the memory of computer system 100 as a whole, including any memory or storage device within or coupled to computer 100 (e.g., via auxiliary storage interface 140).

Application programs 122 and operating system 126 may work with a plurality of objects 124. Some of these objects 124 may be shared by more than one user. Objects 124 each contain data and at least one method, which are not shown. As previously stated, a client program (e.g., method) must call a server method (i.e., called method) to gain access to or otherwise manipulate the information controlled by the called object. It should be noted that a statement of a method being a client or a server is one of relativity. In other words, a method that is said to be a client method relative to a second method may well be a server method relative to yet a third method. It should also be noted that application programs 122 may contain non-object-oriented programs that nevertheless have access to objects 124. Further, use of the term client program should be taken to generically refer to a client method or non-object-oriented client program. It should be noted, though, that in a typical client-server environment, the client program would be the mechanism on the server computer system that handles the incoming requests from the client computer system, not the programs that are generating the requests while executing on the client computer system. For the sake of simplicity in the discussion herein, a client is referred to as a "user", while a server that is providing access to an object or a method within the object is referred to as a "called object" or a "called method," respectively.

Operating system 126 is a multi-tasking operating system, similar to an operating system known in the industry as OS/400; however, those skilled in the art will appreciate that the spirit and scope of the present invention is not limited to any particular operating system. Operating system 126 is further shown to contain a method call manager 128 which performs supervisory functions, such as authorization and locking, if needed, when a method is accessed by a user.

In the preferred embodiment, method call manager 128 suitably handles all calls to methods in a computer program. In alternative embodiments, however, method call manager 128 may only handle calls to protected methods that require supervisory functions to be performed, while calls to unprotected methods are routed using a different mechanism within operating system 126. For details of one specific mode of operation for method call manager 128, see the parent to this patent. In addition to routing all methods in the preferred embodiment, method call manager 128 also performs supervisory functions, such as authorization checking and locking.

Figure 2:
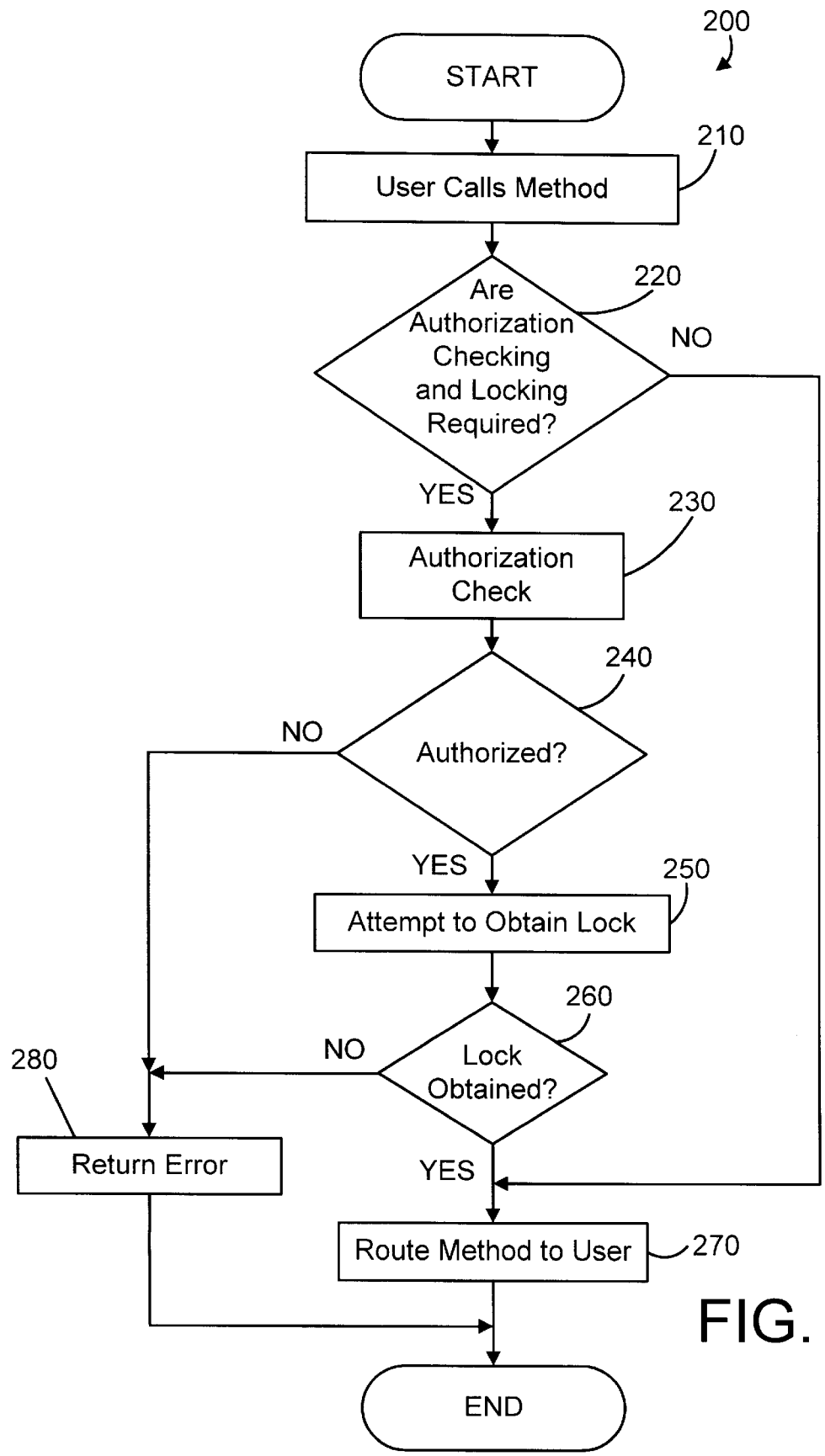
FIG. 2 is a flow diagram of a method routing mechanism in accordance with the present invention.

Referring to FIG. 2, a method 200 in accordance with the present invention uses method call manager 128 to improve the performance of computer system 100 by providing a way for computer system 100 to automatically perform supervisory functions, if needed, when an object method is called by a user. In particular, once a user calls a method (step 210), method call manager 128 performs various authorization checking and locking functions. For example, method call manager 128 first determines if authorization checking and locking are required (step 220) for the object corresponding to the called method (i.e., called object).

One suitable criterion for determining whether authorization checking and locking are required depends on whether the called object is a protected object (i.e., whether the object is persistent, secure and shared) or an unprotected object. Determining whether an object is protected or not depends on how the computer system distinguishes between protected and unprotected objects. One suitable scheme uses different pointers types for protected and unprotected objects. Another suitable scheme uses memory mapping, placing protected objects in one region of memory and placing unprotected objects in a different region of memory. Any scheme may be used within the scope of the present invention to distinguish between objects that require supervisory functions and objects that do not. In this manner, supervisory functions are performed only prior to routing protected methods, and are not performed prior to routing unprotected methods. Given the overhead of performing supervisory functions such as authorization checking and locking, the performance of the computer system is greatly improved by automatically detecting when the supervisory functions are unnecessary.

If authorization and locking is required (step 220=YES), method call router 128 performs an authorization check (step 230) to determine whether the called object requires authorization and locking. If the user is not authorized to access the called object (step 240=NO), an error is returned (step 280). If the user is authorized to access the called object (step 240=YES), method call router 128 attempts to obtain lock of the called object for the user calling the method (step 250). In the preferred embodiment, there are many different levels of lock that are used in computer system 100. If a sufficient lock level cannot be obtained for the called object containing the called method, (step 260=NO), an error is returned (step 280). If a sufficient lock level is successfully obtained (step 260=YES), method call router 128 routes the method to the user calling the method (step 270).

Figure 3:
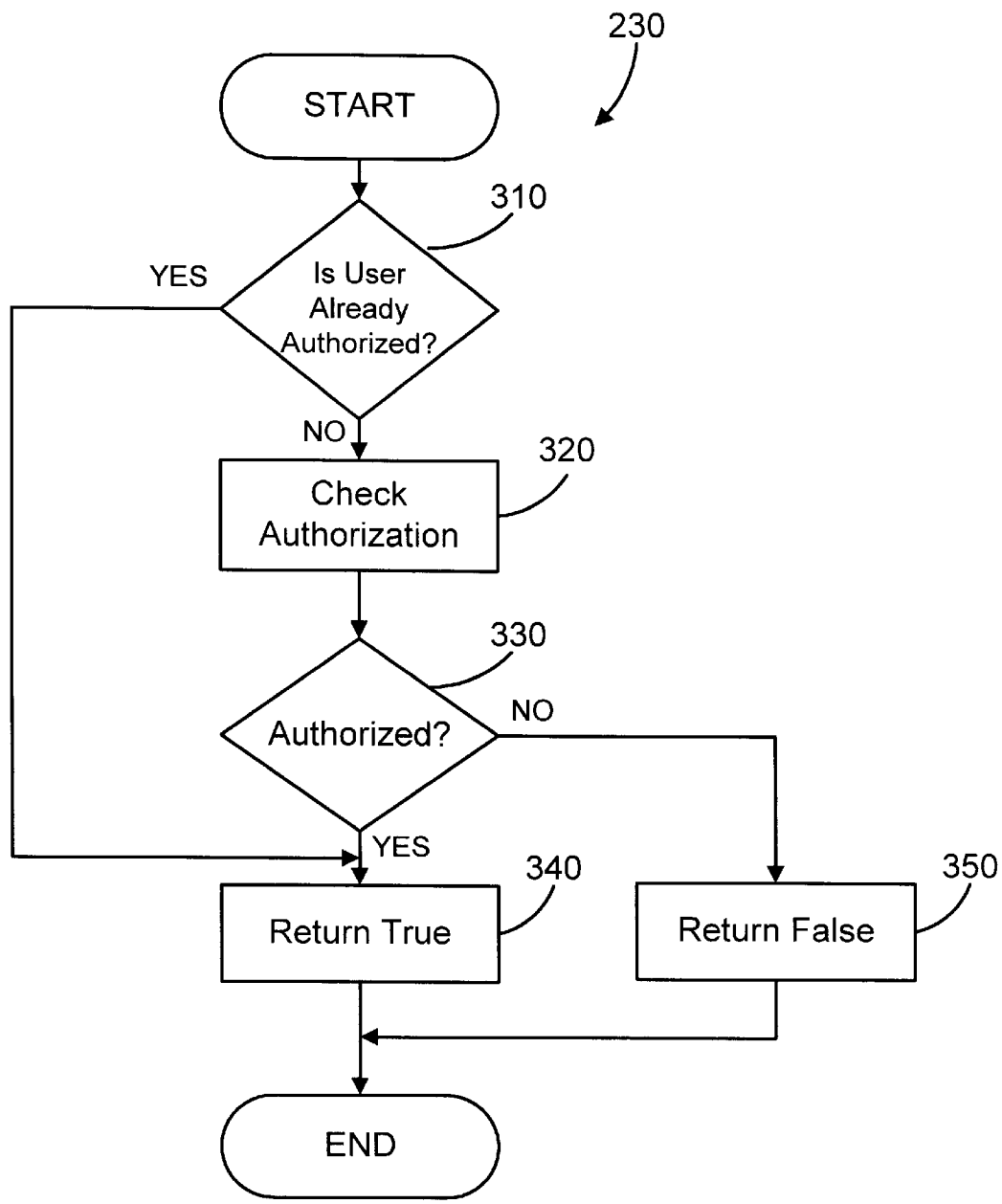
FIG. 3 is a flow diagram of the authorization check 230 of FIG. 2.

FIGS. 3–6 show in more detail some of the steps in method 200 of FIG. 2. Referring now to FIG. 3, during the authorization check (step 230), method call manager 128 determines if the user is already authorized to use the called object (step 310). If so (step 310=YES), a TRUE is returned (step 340), indicating that the user is authorized to access the called object. If the user is not already authorized to the called object (step 310=NO), method call manager 128 must check the authorization of the user (step 320) to determine whether the user is authorized to access the called object. If method call manager 128 determines that the user is authorized to access the called object (step 330=YES), a TRUE is returned (step 340). If the user is not authorized to access the called object (step 330=NO), a FALSE is returned (step 350). Note that if a TRUE is returned in step 230, the answer to the question in step 240 is YES, and if a FALSE is returned in step 230, the answer in step 240 is NO. Once authorization has been verified (step 240=YES), method call manager 128 then attempts to obtain lock of the called object (step 250).

Figure 4:
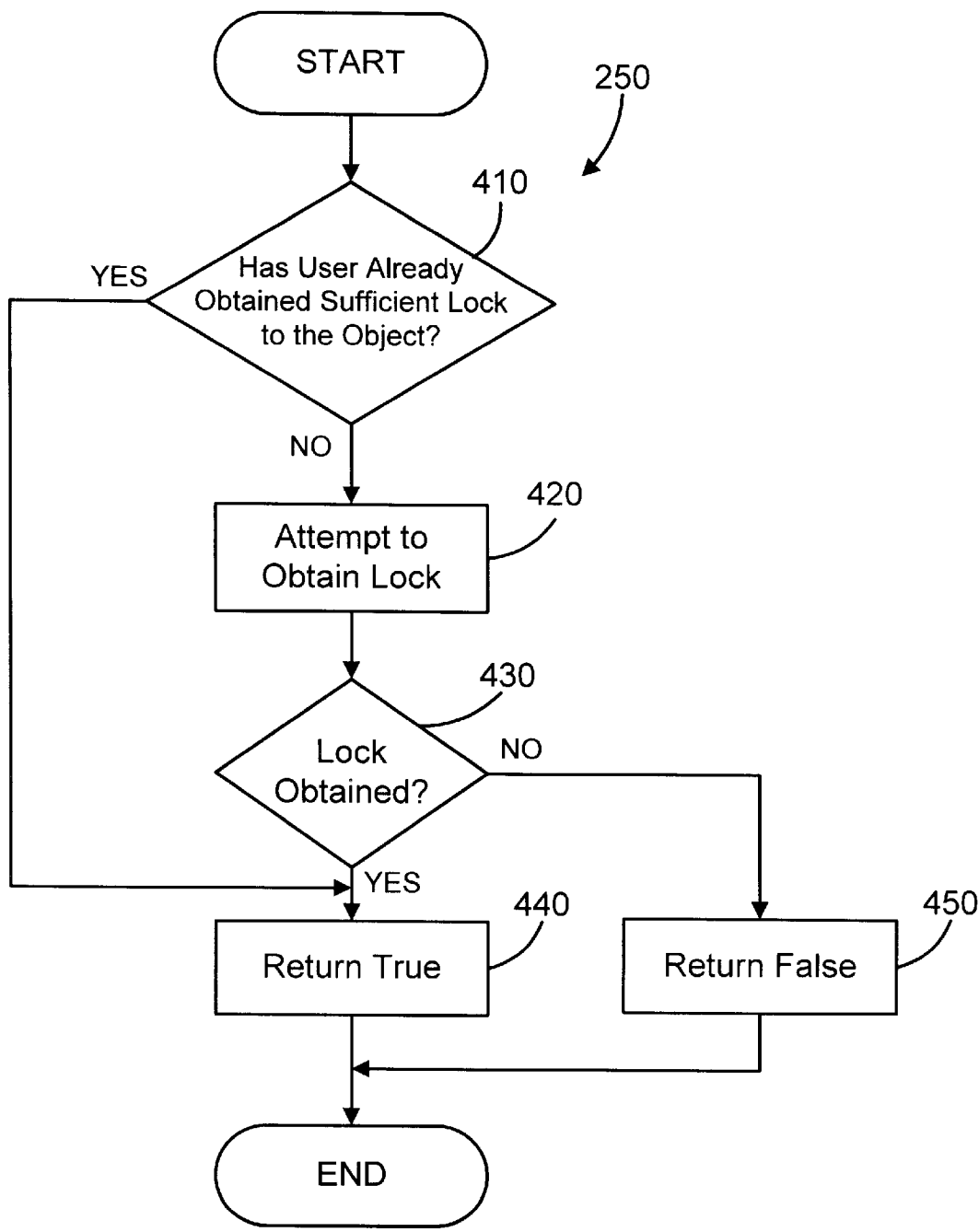
FIG. 4 is a flow diagram of step 250 of FIG. 2 which attempts to obtain lock of the object.

Referring to FIG. 4, method call manager 128 attempts to obtain lock (step 250) by first determining if the user has already obtained sufficient lock to the called object (step 410). If the user already has sufficient lock (step 410=YES), a TRUE is returned (step 440). If the user does not yet have sufficient lock (step 410=NO), method call manager then attempts to obtain lock (step 420) of the called object for the user. If lock is obtained (step 430=YES), a TRUE is returned (step 440). Likewise, if lock is not obtained (step 430=NO), a FALSE is returned (step 450). If the attempt to obtain lock (step 250) returns a TRUE, the answer to the question in step 260 is YES, and if step 250 returns a FALSE, the answer in step 260 is NO.

Recent versions of the AS/400 computer system by IBM were object-based rather than object-oriented, meaning that objects could not be sub-classed. To access objects that were persistent and shared, a CALL PROCEDURE instruction in the operating system was typically used. However, to make the AS/400 object-oriented rather than object-based requires the capability of calling a method rather than a procedure. Thus, a new instruction CALL METHOD was needed in the operating system. A CALL METHOD instruction in accordance with the present invention automatically performs supervisory functions (such as authorization checking and locking), if needed, when the method is called, completely transparent to the client program (user) calling the method. For the AS/400, when a method is called from within a client program, compiler 125 uses a CALL METHOD instruction to route the method to the user. The CALL METHOD instruction generally has at least two parameters that are passed, the object pointer of the object that contains the method being called, and the method signature identifying which of the called object's methods are being called. According to the preferred embodiment, the mechanism of the present invention requires that all calls to methods use the CALL METHOD instruction. This is accomplished with relative ease by forcing compiler 125 to use the CALL METHOD instruction each time a method is called in the client program. In addition, operating system 126 must have a method call manager 128 that interprets the CALL METHOD instruction, and in response to the CALL METHOD instruction, performs any necessary supervisory functions prior to routing the method to the client program.

Figure 5:
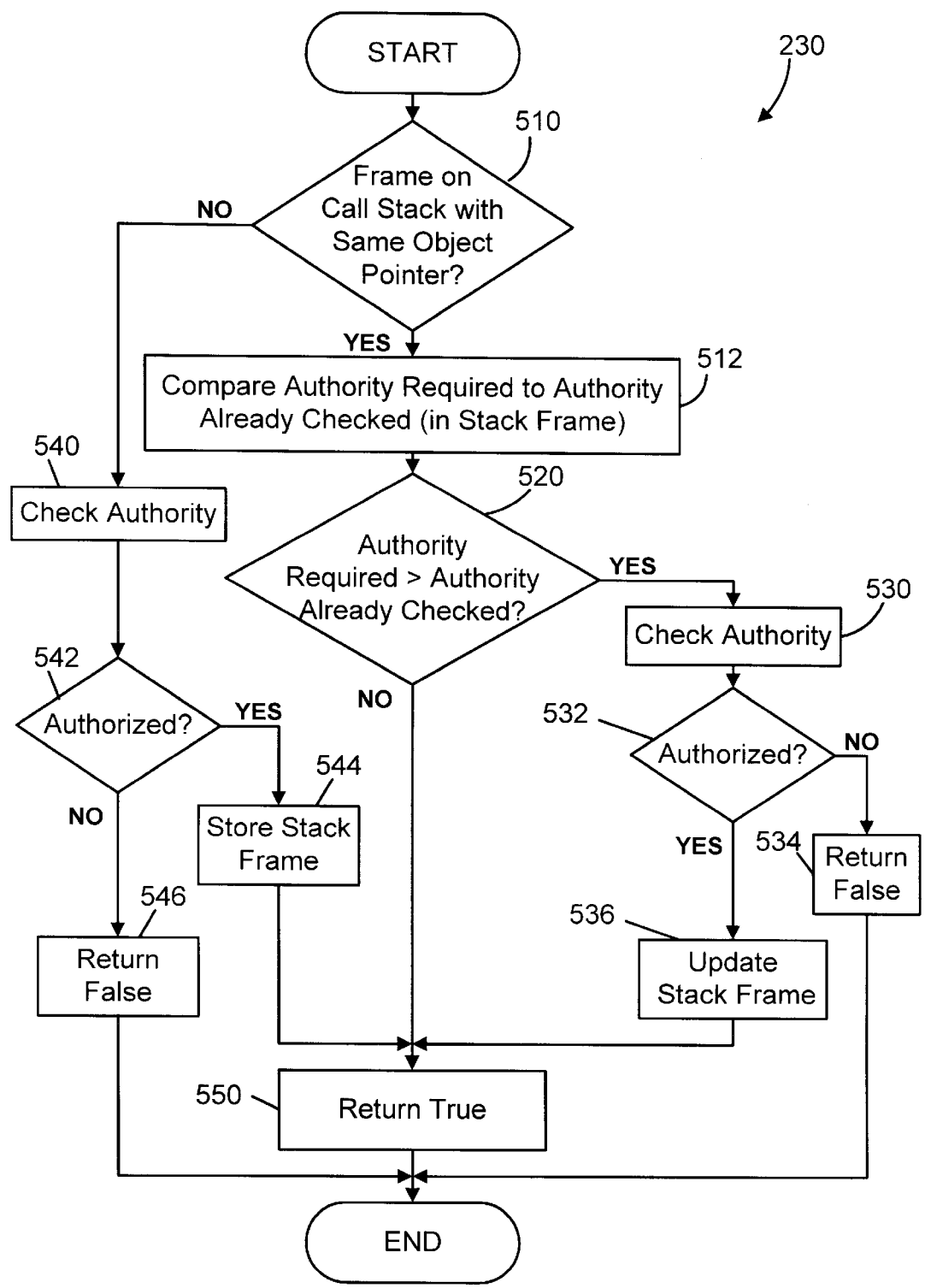
FIG. 5 is a flow diagram of the specific implementation of the authorization check step 230 of FIGS. 2 and 3 when used in an IBM AS/400 computer system.

For an AS/400 computer system, a call stack is used to store certain parameters relating to a method or procedure that is called. This call stack contains local knowledge regarding methods that the user has already called. The call stack in the AS/400 is only accessible to the operating system; users do not have access to information on the call stack. When a CALL METHOD instruction is encountered, method call manager 128 determines from information stored on the call stack whether the calling user is already authorized to access the called object and whether the user already has sufficient lock for the object containing the called method. Each user (or process) typically has a separate call stack. A call stack suitably contains one or more stack frames that contain various data, including a pointer indicating the type of object that has been called, the current level of authorization that was checked prior to routing the method to the user, and the locking level that has already been obtained for the called object. FIG. 5 illustrates a method for step 230 of FIGS. 2 and 3 when a call stack is used. First, method call manager 128 determines if there is a frame on the calling user's call stack corresponding to a method call that has the same object pointer (step 510). For the AS/400, the type of pointer in a stack frame determines whether the object referred to by the frame is protected or unprotected. An object pointer indicates a protected object, one that requires authorization checking and locking. A space pointer, in contrast, indicates an unprotected object, one that does not require authorization checking and locking. In this manner method call manager 128 may determine whether authorization and locking is required (step 220 of FIG. 2) by simply looking at the type of pointer that points to the called object. This simple test allows method call manager 128 to avoid the relatively high overhead of performing supervisory functions when they are not required.

During authorization check (step 230, FIGS. 2, 3 and 5), method call manager first determines if the user is already authorized to access the called object by looking at the frames on the call stack for the user to see if there is a method call frame on the call stack that has the same object pointer (step 510). If so (step 510=YES), this indicates that the user is already accessing the called object, and that the current authorization and locking information is already stored on the call stack in the matching stack frame. Method call manager 128 then compares the authority of the request stored on the stack frame to the authority required by the new request (step 512). If the stack frame indicates that the user has already obtained sufficient authority to access the object (step 520=NO), a TRUE is returned to indicate that the user has authority to access the called object. If, however, the authority already checked (i.e., on the stack frame) is less than the required authority (step 520=YES), method call manager 128 must check the authority of the user to the called object (step 530). This authority check (step 530) is suitably performed using a system call to the operating system that returns a TRUE if the user is authorized to access the object, and that returns a FALSE if the user is not authorized to access the object. Method call manager 128 then returns a FALSE (step 534) if the user is not authorized to access the called object (step 532=NO). If the user is authorized to access the called object (step 532=YES), method call manager 128 updates the stack frame pertaining to the object (step 536) to indicate the current level of authorization obtained by the user for the called object, and returns TRUE (step 550).

If no method call stack frame exists on the call stack that has the same object pointer as the called object (step 510=NO), method call manager 128 must check the authority (step 540) of the user with regard to the object being called. This authority check (step 540) is the same system call used in step 530. If the user is authorized to access the object (step 542=YES), a new stack frame is stored (step 544) to indicate the authorization level for the user to the object, and a TRUE is returned (step 550). If the user is not authorized to access the object (step 542=NO), a FALSE is returned (step 546).

The process of attempting to obtain lock of an object (step 250 in FIG. 6) in an AS/400 computer system is very similar to the process of checking authorization (step 230 in FIG. 5). First, method call manager 128 determines whether a stack frame exists on the user's call stack corresponding to a method call that has the same object pointer as the called object (step 610). If so (step 610=YES), method call manager 128 compares the lock already obtained (as stored in the stack frame) to the lock required by the new method call (step 612). If the level of lock required is equal to or less than the level of lock stored in the stack frame (step 620=NO), the user already has sufficient lock, and a TRUE is returned (step 650). If the level of lock for the object being called is greater than the level of lock stored on the stack frame (step 620=YES), method call manager 128 attempts to obtain lock (step 630). The attempt to obtain lock (step 630) is a suitable system call to the operating system that returns a TRUE if the required lock level is obtained for the user and a FALSE if the required lock level cannot be obtained. If lock is not obtained (step 632=NO), a FALSE is returned to indicate that the locking attempt failed. If lock is obtained (step 632=YES), the stack frame is updated (step 636) to indicate in the stack frame the new lock level that was obtained for the requesting user for the called object, and a TRUE is returned (step 650), indicating that the attempt to obtain lock was successful.

If no method call stack frame exists on the call stack with the same object pointer (step 610=NO), method call manager 128 attempts to obtain the requisite lock level (step 640) for the user to access the called object. This locking attempt (step 640) is suitably the same system call used in step 630 to determine whether or not the user has obtained sufficient lock of the called object. If the locking attempt is successful (step 642=YES), a stack frame is stored (step 644) that indicates the level of locking obtained for the called object, and a TRUE is returned (step 650) to indicate that the attempt to obtain the requisite lock level was successful. If, however, the locking attempt is unsuccessful (step 646=NO), a FALSE is returned (step 646) to indicate that the requisite lock level could not be obtained.

Note that while the discussion herein assumes that access to a method by a user requires authorization checking and locking for the object that contains the called method, this is shown for the purposes of illustration. It is equally within the scope of the present invention to perform supervisory functions such as authorization checks and locking in other ways, rather than for the object that contains the called method. Furthermore, while the authorization checking step (step 230) and locking step (step 250) are shown as two separate and distinct processes, one skilled in the art will recognize from the similarity of these two processes that various stages of both the authorization checking and locking could be optimized. In fact, in the preferred embodiment disclosed herein when used on an AS/400 computer system, the authorization check (step 230) and attempt to obtain lock (step 250) are performed simultaneously by performing the methods of FIGS. 5 and 6 at the same time.

Figure 6:
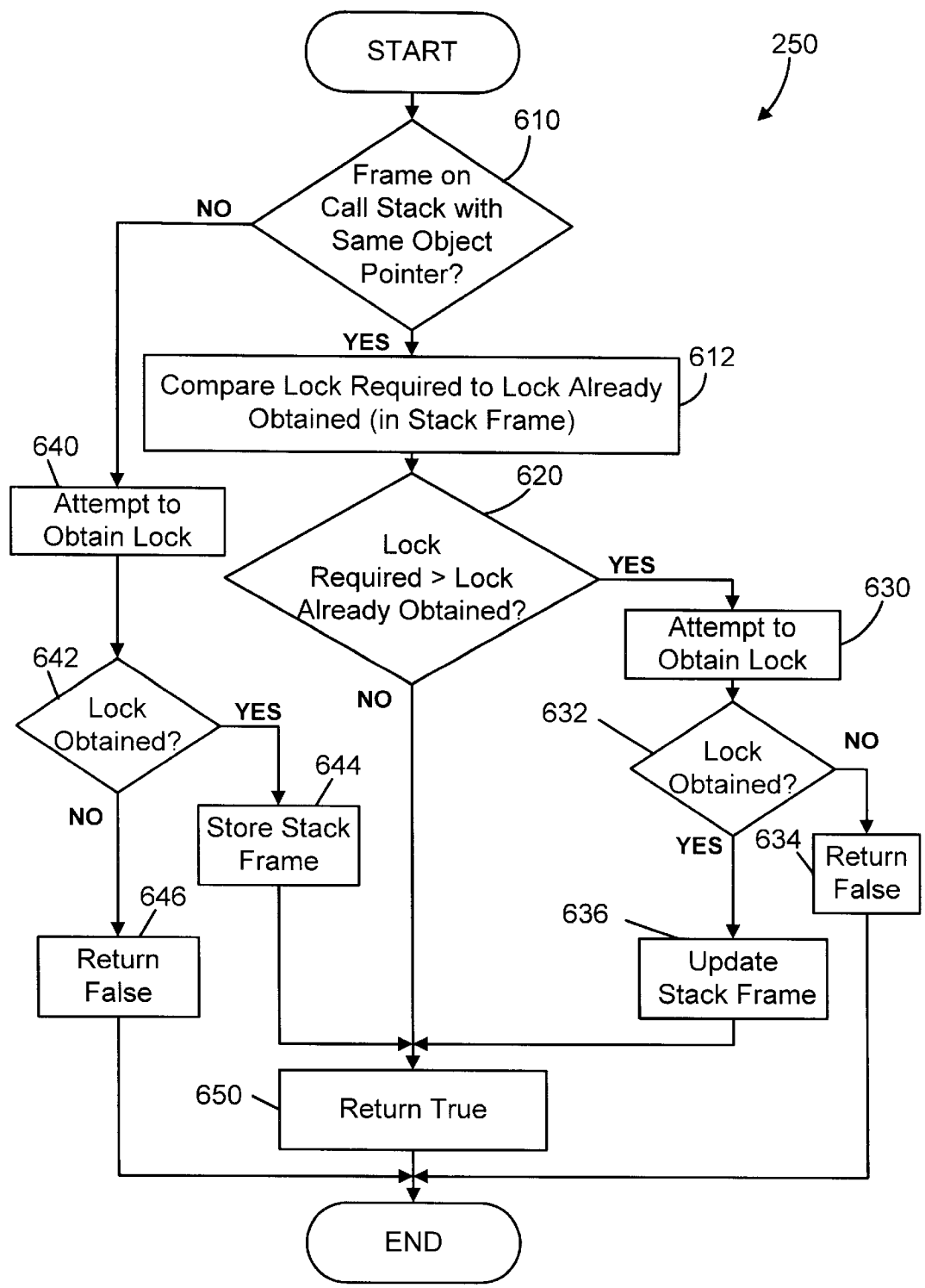
FIG. 6 is a flow diagram of the specific implementation of the locking step 250 of FIGS. 2 and 4 when used in an IBM AS/400 computer system.

In the preferred embodiment disclosed herein, all method calls are handled by method call manager 128. In this manner, all required authorization checks and locking of objects is performed automatically when a method is called. Method call manager 128 also detects when supervisory functions are not required for a called method, and skips the supervisory functions when unnecessary. The authorization and checking are preferably performed using system calls to the operating system, thereby creating an authorization and locking scheme that is secure and cannot be tampered with or defeated by a programmer that is programming client objects (i.e., users) of the methods being called. In addition, as shown in FIGS. 5 and 6, if the user is already authorized and locked to the called object (corresponding to the method called), method call manager 128 does not have to repeat the authorization check and locking steps, but instead can detect from the calling user's call stack (i.e., using local knowledge) whether the user is already authorized and whether the user already has the requisite level of lock needed to allow access to the called method. In this manner, a single CALL METHOD instruction that specifies the object and method being called avoids performing supervisory functions when not needed, automatically performs supervisory functions such as authorization checking and locking when needed, yet avoids performing these supervisory functions if the authority of the user has already been checked and the user has already obtained the needed lock of the called object.

It is important to note that while the present invention has been described herein in the context of a fully functional computer system, those skilled in the art will appreciate that an operating system in accordance with the present invention is capable of being distributed as a program product via floppy disk, CD-ROM, or other form of recordable media or via any type of electronic transmission mechanism.

While the invention has been particularly shown and described with reference to preferred exemplary embodiments thereof, it will be understood by those skilled in the art that various changes in form and details may be made therein without departing from the spirit and scope of the invention. For example, while the supervisory functions of authorization checking and locking are specifically disclosed herein, it is within the scope of the present invention to automatically perform any supervisory function when routing methods. Examples of other suitable supervisory functions within the scope of the present invention include auditing and updating the change date of an object. Auditing is a supervisory function that records each time an object is accessed, and by which user, to trace the activity of the object. Updating the change date of an object is a supervisory function that is performed when an object is updated to reflect the date of the most recent update. Any type of supervisory function may be performed automatically when routing methods within the scope of the present invention.

We claim:

1. A computer apparatus comprising:

a processing unit;

computer system memory coupled to the processing unit;

at least one dynamically relocatable object stored in the computer system memory, each object having data and at least one method, each method being stored in the computer system memory for execution on the processing unit, each method being one of a protected type and an unprotected type; and a method call manager, the method call manager:

(1) detecting a current method call by a client object;
(2) in response to the current method call, determining whether the current method is protected or unprotected;
(3) if the current method is unprotected, granting access to the current method by the client object without performing authorization checking and locking;
(4) if the current method is protected, automatically performing authorization and checking comprising the steps of:
   (4A) if the client object is already accessing via a previous method call the object containing the called method:
      (4A1) determining an authorization level and lock level for the previous method call;
      (4A2) comparing the authorization level of the previous method call to a required authorization level for the current method call;
         (4A2a) if the required authorization level of the current method call is greater than the authorization level of the previous method call, going to step (4B1);
         (4A2b) if the required authorization level of the current method call is less than or equal to the authorization level of the previous method call;
            (4A2b1) comparing the lock level already obtained in the previous method call to a required lock level for the current method call;
            (4A2b2) if the required lock level of the current method call is greater than the lock level of the previous method call:
               (4A2b2A) attempting to obtain the required lock level of the current method call;
               (4A2b2B) if the attempt in (4A2b2A) is successful, granting access to the current method by the client object;
               (4A2b2C) if the attempt in (4A2b2A) is unsuccessful, denying access to the current method by the client object;
            (4A2b3) if the required lock level of the current method call is less than or equal to the lock level of the previous method call, granting access to the current method by the client object;
   (4B) if the client object is not already accessing via a previous method call the object containing the called method:
      (4B1) performing a system call to determine whether the client object is authorized to call the current method;
      (4B2) if the client object is authorized to call the current method, going to step (4A2b1);
      (4B3) if the client object is not authorized to call the current method, denying access to the current method by the client object.

2. The computer apparatus of claim 1 wherein the method call manager operates in response to a call method instruction that causes the method call manager to perform its functions automatically when the current method is called by the client object using the call method instruction.

3. The computer apparatus of claim 2 wherein the call method instruction includes at least two passed parameters, the first of the passed parameters including an object identifier identifying the object that contains the current method, and the second of the parameters including a method identifier identifying the current method.

4. The computer apparatus of claim 2 further comprising an operating system stored within the computer system memory for execution on the processing unit, and wherein the call method instruction executes the system call to the operating system in step (4B1) if status regarding authorization checking and locking of the current method is unavailable from information local to the current method.

5. A computer apparatus comprising:
a processing unit;
computer system memory coupled to the processing unit;
at least one dynamically relocatable object stored in the computer system memory, each object having data and at least one method, each method being stored in the computer system memory for execution on the processing unit, each method being one of a protected type and an unprotected type;
an operating system stored in the computer system memory for execution by the processing unit, the operating system providing a plurality of system call instructions for the processing unit to execute; and
a method call manager, the method call manager:
   (1) detecting a current method call by a client object;
   (2) in response to the current method call, determining whether the current method is protected or unprotected;
   (3) if the current method is unprotected, granting access to the current method by the client object without performing authorization checking and locking;
   (4) if the current method is protected, automatically performing authorization and checking comprising the steps of:
      (4A) if the client object is already accessing via a previous method call the object containing the called method:
         (4A1) determining an authorization level and lock level for the previous method call;
         (4A2) comparing the authorization level of the previous method call to a required authorization level for the current method call;
      (4A2a) if the required authorization level of the current method call is greater than the authorization level of the previous method call, going to step (4B1);
      (4A2b) if the required authorization level of the current method call is less than or equal to the authorization level of the previous method call:
         (4A2b1) comparing the lock level already obtained in the previous method call to a required lock level for the current method call;
         (4A2b2) if the required lock level of the current method call is greater than the lock level of the previous method call:
            (4A2b2A) attempting to obtain the required lock level of the current method call;
            (4A2b2B) if the attempt in (4A2b2A) is successful, granting access to the current method by the client object;
            (4A2b2C) if the attempt in (4A2b2A) is unsuccessful, denying access to the current method by the client object;
         (4A2b3) if the required lock level of the current method call is less than or equal to the lock level of the previous method call, granting access to the current method by the client object;
      (4B) if the client object is not already accessing via a previous method call the object containing the called method:
         (4B1) performing a system call to the operating system to determine whether the client object is authorized to call the current method;

(4B2) if the client object is authorized to call the current method, going to step (4A2b1);

(4B3) if the client object is not authorized to call the current method, denying access to the current method by the client object.

6. A program product comprising:

a recordable media; and an operating system recorded on the recordable media, the operating system including a method call manager, the method call manager (1) detecting a current method call by a client object;

(2) in response to the current method call, determining whether the current method is protected or unprotected;

(3) if the current method is unprotected, granting access to the current method by the client object without performing authorization checking and locking;

(4) if the current method is protected, automatically performing authorization and checking comprising the steps of:

(4A) if the client object is already accessing via a previous method call the object containing the called method:

(4A1) determining an authorization level and lock level for the previous method call;

(4A2) comparing the authorization level of the previous method call to a required authorization level for the current method call;

(4A2a) if the required authorization level of the current method call is greater than the authorization level of the previous method call, going to step (4B1);

(4A2b) if the required authorization level of the current method call is less than or equal to the authorization level of the previous method call:

(4A2b1) comparing the lock level already obtained in the previous method call to a required lock level for the current method call;

(4A2b2) if the required lock level of the current method call is greater than the lock level of the previous method call:

(4A2b2A) attempting to obtain the required lock level of the current method call;

(4A2b2B) if the attempt in (4A2b2A) is successful, granting access to the current method by the client object;

(4A2b2C) if the attempt in (4A2b2A) is unsuccessful, denying access to the current method by the client object;

(4A2b3) if the required lock level of the current method call is less than or equal to the lock level of the previous method call, granting access to the current method by the client object;

(4B) if the client object is not already accessing via a previous method call the object containing the called method:

(4B1) performing a system call to determine whether the client object is authorized to call the current method;

(4B2) if the client object is authorized to call the current method, going to step (4A2b1);

(4B3) if the client object is not authorized to call the current method, denying access to the current method by the client object.

7. A computer-implemented method for routing object methods in a computer system, the computer-implemented method including the steps of:

providing at least one dynamically relocatable object stored in a computer system memory;

providing data and at least one object method corresponding to each object, each method being one of a protected type and an unprotected type;

calling an object method on a particular object from a client object;

providing a supervisory mechanism;

the supervisory mechanism performing the steps of:

(1) detecting a current method call by a client object;

(2) in response to the current method call, determining whether the current method is protected or unprotected;

(3) if the current method is unprotected, granting access to the current method by the client object without performing authorization checking and locking;

(4) if the current method is protected, automatically performing authorization and checking comprising the steps of:

(4A) if the client object is already accessing via a previous method call the object containing the called method:

(4A1) determining an authorization level and lock level for the previous method call;

(4A2) comparing the authorization level of the previous method call to a required authorization level for the current method call;

(4A2a) if the required authorization level of the current method call is greater than the authorization level of the previous method call, going to step (4B1);

(4A2b) if the required authorization level of the current method call is less than or equal to the authorization level of the previous method call:

(4A2b1) comparing the lock level already obtained in the previous method call to a required lock level for the current method call;

(4A2b2) if the required lock level of the current method call is greater than the lock level of the previous method call:

(4A2b2A) attempting to obtain the required lock level of the current method call;

(4A2b2B) if the attempt in (4A2b2A) is successful, granting access to the current method by the client object;

(4A2b2C) if the attempt in (4A2b2A) is unsuccessful, denying access to the current method by the client object;

(4A2b3) if the required lock level of the current method call is less than or equal to the lock level of the previous method call, granting access to the current method by the client object;

(4B) if the client object is not already accessing via a previous method call the object containing the called method:

(4B1) performing a system call to determine whether the client object is authorized to call the current method;

(4B2) if the client object is authorized to call the current method, going to step (4A2b1);

(4B3) if the client object is not authorized to call the current method, denying access to the current method by the client object.

8. A computer-implemented method for automatically performing at least one of a plurality of supervisory functions when one of a plurality of object methods on one of a plurality of dynamically relocatable objects is called by a client object invoking the name of the one object, the computer-implemented method comprising the steps of:

providing an operating system;

providing at least one system call instruction in the operating system for performing the supervisory functions;

the client object calling an object method by invoking the name of the one object using the at least one system call instruction in the operating system, the called object method comprising a current method call, and in response to the system call instruction, performing the steps of;

(1) determining whether the current method is protected or unprotected;

(2) if the current method is unprotected, granting access to the current method by the client object without performing authorization checking and locking;

(3) if the current method is protected, automatically performing authorization and checking comprising the steps of:

(3A) if the client object is already accessing via a previous method call the object containing the called method:

(3A1) determining an authorization level and lock level for the previous method call;

(3A2) comparing the authorization level of the previous method call to a required authorization level for the current method call;

(3A2a) if the required authorization level of the current method call is greater than the authorization level of the previous method call, going to step (4B1);

(3A2b) if the required authorization level of the current method call is less than or equal to the authorization level of the previous method call:

(3A2b1) comparing the lock level already obtained in the previous method call to a required lock level for the current method call;

(3A2b2) if the required lock level of the current method call is greater than the lock level of the previous method call:

(3A2b2A) attempting to obtain the required lock level of the current method call;

(3A2b2B) if the attempt in (3A2b2A) is successful, granting access to the current method by the client object;

(3A2b2C) if the attempt in (3A2b2A) is unsuccessful, denying access to the current method by the client object;

(3A2b3) if the required lock level of the current method call is less than or equal to the lock level of the previous method call, granting access to the current method by the client object;

(3B) if the client object is not already accessing via a previous method call the object containing the called method:

(3B1) performing a system call to determine whether the client object is authorized to call the current method;

(3B2) if the client object is authorized to call the current method, going to step (3A2b1);

(3B3) if the client object is not authorized to call the current method, denying access to the current method by the client object.

9. A method for distributing a program product comprising the steps of:

initiating a connection between a first computer system and a second computer system;

transmitting the program product from the first computer system to the second computer system, the program product being an operating system, the operating system including a method call manager, the method call manager:

(1) detecting a current method call by a client object;

(2) in response to the current method call, determining whether the current method is protected or unprotected;

(3) if the current method is unprotected, granting access to the current method the client object without performing authorization checking and locking;

(4) if the current method is protected, automatically performing authorization and checking comprising the steps of:

(4A) if the client object is already accessing via a previous method call the object containing the called method:

(4A1) determining an authorization level and lock level for the previous method call;

(4A2) comparing the authorization level of the previous method call to a required authorization level for the current method call;

(4A2a) if the required authorization level of the current method call is greater than the authorization level of the previous method call, going to step (4B1);

(4A2b) if the required authorization level of the current method call is less than or equal to the authorization level of the previous method call:

(4A2b1) comparing the lock level already obtained in the previous method call to a required lock level for the current method call;

(4A2b2) if the required lock level of the current method call is greater than the lock level of the previous method call:

(4A2b2A) attempting to obtain the required lock level of the current method call;

(4A2b2B) if the attempt in (4A2b2A) is successful, granting access to the current method by the client object;

(4A2b2C) if the attempt in (4A2b2A) is unsuccessful, denying access to the current method by the client object;

(4A2b3) if the required lock level of the current method call is less than or equal to the lock level of the previous method call, granting access to the current method by the client object;

(4B) if the client object is not already accessing via a previous method call the object containing the called method:

(4B1) performing a system call to determine whether the client object is authorized to call the current method;

(4B2) if the client object is authorized to call the current method, going to step (4A2b1);

(4B3) if the client object is not authorized to call the current method, denying access to the current method by the client object.

* * * * *